United States Patent
Koers et al.

(10) Patent No.: US 10,611,174 B2
(45) Date of Patent: Apr. 7, 2020

(54) METHOD FOR PRINTING ON CONTAINERS (71) Applicant: KHS GmbH, Dortmund (DE)

(72) Inventors: Sascha Koers, Bergkamen (DE); Katrin Preckel, Gelsenkirchen (DE); Markus Reiniger, Mönchengladbach (DE); Werner Van De Wynckel, Humbeek (BE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 16/313,632

(22) PCT Filed: May 19, 2017

(86) PCT No.: PCT/EP2017/062100
§ 371 (c)(1),
(2) Date: Dec. 27, 2018

(87) PCT Pub. No.: WO2018/019442
PCT Pub. Date: Feb. 1, 2018

(65) Prior Publication Data
US 2019/0232682 A1    Aug. 1, 2019

(30) Foreign Application Priority Data
Jul. 29, 2016 (DE) .......................... 10 2016 114 123

(51) Int. Cl.
*B41J 3/407* (2006.01)
*H04N 1/60* (2006.01)
*B41M 1/40* (2006.01)
*B41J 2/21* (2006.01)

(52) U.S. Cl.
CPC ............... *B41J 3/4073* (2013.01); *B41J 2/21* (2013.01); *B41M 1/40* (2013.01); *H04N 1/6055* (2013.01)

(58) Field of Classification Search
CPC ....... B41J 3/4073; B41J 2/04595; B41M 1/40
See application file for complete search history.

(56) References Cited

U.S. PATENT DOCUMENTS

| | | | |
|---|---|---|---|
| 2005/0036159 A1 | 2/2005 | Sharma | |
| 2007/0165068 A1 | 7/2007 | Tsuboi | |
| 2010/0245446 A1 | 9/2010 | Nishikori et al. | |
| 2012/0050370 A1 | 3/2012 | Iritani et al. | |
| 2012/0081436 A1 | 4/2012 | Yamada et al. | |
| 2012/0081444 A1* | 4/2012 | Saito ..................... | B41J 2/2146 347/15 |

(Continued)

FOREIGN PATENT DOCUMENTS

| | | |
|---|---|---|
| DE | 10 2007 036 752 | 2/2009 |
| DE | 10 2007 050 490 | 4/2009 |

(Continued)

*Primary Examiner* — Julian D Huffman
(74) *Attorney, Agent, or Firm* — Occhiuti & Rohlicek LLP (57) ABSTRACT A method comprising printing multicolored images on containers includes providing overall-image data, extracting partial-image data from the overall-image data, print-head-specific calibration-data for the print heads, using the partial-image data and the first print-head-specific calibration-data for calculating print-head image-data for each print head, and causing the print heads to print corresponding partial images on containers, each partial image corresponding to one of the colors in the multicolored images.

18 Claims, 3 Drawing Sheets (56) References Cited

U.S. PATENT DOCUMENTS

2014/0208699 A1* 7/2014 Reiniger ............... B41J 3/4073
53/510
2017/0313112 A1* 11/2017 Sonnauer ............... B41J 29/393

FOREIGN PATENT DOCUMENTS

| DE | 10 2011 112106 | 2/2013 |
| DE | 10 2014 116201 | 5/2016 |
| DE | 10 2015 100536 | 7/2016 |
| EP | 2 639 069 | 9/2013 |

* cited by examiner

METHOD FOR PRINTING ON CONTAINERS

RELATED APPLICATIONS

This is the national stage of international application PCT/EP2017/062100, filed in May 19, 2017, which claims the Jul. 29, 2016 priority date of German application DE102016114123.2, the contents of which are herein incorporated by reference.

FIELD OF INVENTION

The invention relates to a method for printing on containers and to a device for printing on containers.

BACKGROUND

In many cases, it is useful to print information on containers. This information lets the consuming public know what is in the container. Usually, this information is printed in several colors using inkjet printers. Each inkjet printer prints one color.

A lack of uniformity among containers leads to a negative impression in the consuming public. This extends to the information printed on the containers. A particular shade of yellow, for example, should appear the same across all containers.

SUMMARY

An object of the invention is to overcome inherent variations in print heads to print on containers in a way that yield printed images that, to a human, appear identical or essentially identical and to do so with high throughput.

According to a first aspect, the invention relates to a method for printing a superposition of images on a container, either directly on their surface or on a label attached to their surface, using a printing device in which each of a plurality of printing stations prints one of the images that are ultimately superimposed on the container. Each of these images is in one color. The superposition of images is thus perceived by a human observer as a single multicolored image.

The printing device comprises one or more conveying elements that can be driven to rotate about a vertical machine axis, wherein a plurality of printing stations are provided, each of which has at least one print head, and the printing stations of a conveying element are configured for the application of a printed image with at least one ink. This printed image can be viewed as a "partial" printed-image since the complete printed-image will have multiple colors. Alternatively, one can view the final image as a superposition of images, each of which is in only one color.

The printing device preferably comprises a plurality of conveying elements, at each of which an image is printed upon the container using only one ink.

The method comprises providing overall-image data. The overall-image data contains image information relating to several different inks. The method continues with extracting partial-image data from the overall-image data, wherein the partial-image data relates to an ink applied by the printing stations of a conveying element; providing print-head-specific calibration-data, preferably in a storage unit provided at a printing station that contains that print head; calculating print-head image-data from the partial-image data assigned to the printing station on the basis of the print-head-specific calibration-data, preferably using a processor provided at the respective printing station; and printing on the container at the printing station on the basis of the print-head image-data.

The print-head-specific calibration-data comprises one or more calibration data sets. The individual calibration data sets relate in each case to an optically-measured value that has been derived from a printed image produced by the print head that is to be calibrated and/or related to a control value used during the actuation of the print head.

As a result of using print-head-specific calibration-data in the calculation of print-head image-data, it becomes possible to take into account deviations in the performance of the print heads and to compensate for them as need. As a result, images printed on containers become more uniform and tend to appear the same no matter which print heads were used to print upon the container. In particular, this procedure tends to avoid visually-perceptible deviations in color or color-covering deviations between containers that were printed upon by different print heads.

In one exemplary embodiment, the print-head-specific calibration-data for a particular print head is determined in one or more printing and measuring steps carried out by that print head and stored in the respective printing station that comprises that print head.

The printing steps that lead to the print-head-specific calibration-data are carried out under conditions that correspond to the conditions that would prevail when actually printing on containers in production, for example with an alignment of the print head that corresponds to the alignment used during production printing. In a typical case, where the containers stand upright, this is a vertical alignment, such that the ink drops are dispensed in a horizontal direction. Likewise, during the calibration procedure, a test substrate that is printed upon is made of a material that corresponds to the container material that is to be printed upon. In addition to this, the ink used during the determination of the calibration data is the same ink that is used when printing upon containers during production runs. As a result of this, calibration data will reflect operational conditions that arise when printing upon containers in a production run.

Preferably, the print-head-specific calibration-data is obtained from an optical analysis of a test substrate that has been printed upon under conditions that simulate those that would be present in a production run.

Accordingly, for example, the substrate is printed upon by the actuation of the print head with specific control values and the result of the printing is then optically analyzed in order to obtain a connection between the result of the optical analysis and the control values used. Control values can be, for example, the number of ink drops applied per dot, the size of the ink drops, the voltage used at the actuation of the print head, the frequency used at the actuation of the print head, etc. From the interdependencies of the data from the optical analysis and the control values used, it is possible to determine the print-head-specific calibration-data.

In some embodiments, the print-head-specific calibration-data indicates a connection between a control value that is used for the actuation of the print head and a measured value that is derived from the printed image produced by the print head. In particular, the calibration data can be formed by one or more control curves that indicate which control value must be used in order to obtain a desired optical property in the printed image.

In other embodiments, the calculation of the print-head image-data is carried out by a processor provided in the printing station that contains that print head or by a computer unit assigned to the conveying element that carries that print head. In some practices, the partial-image data is transferred to the printing station, for example using a machine data network. Once there, the printing station's own processor converts it into print-head image-data. In doing so, the printing station's processor takes into account the print-head-specific calibration data.

Alternatively, this conversion is carried out in a computer unit that is located hierarchically between the central computer and the printing station that contains that print head. This intermediate computer unit calculates print-head image-data for several printing stations of a conveying element based on print-head-specific calibration for the relevant printing stations.

In some practices, calculation of print-head image data on the basis of the print-head-specific calibration data includes introducing a quantization error by projecting from a space that has a first number of gray-scale values into a space that has a second number of gray-scale values, with the second number being significantly smaller than the first number. The projection is carried out taking into account the print-head-specific calibration-data. In some practices the first number is 256 and the second number is eight.

In one exemplary embodiment, at the calculation of the print-head image-data on the basis of the print-head-specific calibration-data information includes calculating the number of drops to be applied on a dot. In these cases, the print-head image-data what ink volume is to be applied onto a dot to achieve a particular brightness or gray level. This makes it possible to vary the color covering on a dot.

Some practices include compensating for the quantization error introduced by the projection by applying image dots following one another with the dots being selected to reduce the conspicuousness of the quantization error to the human perceptual system.

Some practices include equilibrating all print heads on a conveying element so that they all print the same color. In some of these practices, each print head prints with a different maximum color coverage and all print heads are made to print with the color coverage of the print head that has the least maximum color coverage. The determination of maximum color coverage for the various print heads can be carried out by printing on a test substrate.

In some practices, a central computer-unit provides the overall-image data to all the conveyors. The central computer unit connects to the individual conveyors or to printing stations or treatment segments containing print heads via a machine data-network. Such practices feature the possibility of centralized data storage.

The actual extraction of partial-image data from overall-image data can be carried out in any number of places, including the central computer unit itself, a processor at the treatment segment that carries out the printing, a processor assigned to the conveyor that has the relevant print head carried on a treatment segment thereof, or at some intermediate processor. In some practices, extraction is carried out at the central computer unit and the partial-image data is then transferred to the relevant treatment segments or printing stations. These various alternatives provide ways of trading off processor capacity and data-transfer capacity.

Some practices feature providing partial-image data in compressed form which can then be unpacked at the printing station or treatment segment. This permits saving on data-transfer capacity.

Other practices feature calculating print-head control data from print-head image-data. This print-head control-data is what causes actuation of one or more nozzles of a print head.

As used herein, "container" refers to all containers, in particular bottles and cans.

As used herein, "error diffusion" refers to a half-tone process in which one selects the color-coverage value of an ink drop based on color-coverage values of adjacent ink dots in an effort to compensate for quantization error.

As used herein, "gray value" refers to the brightness of a dot in an image, and in particular, how light or dark a dot an image appears to a human.

As used herein, "color coverage" refers to the volume of ink applied to a surface and is typically measured by measuring optical density.

As used herein, "essentially" or "approximately" refer to deviations from an exact value that are of no significance to function. Depending on the parameter involved, such deviations can be within ten percent of the exact value or within five percent of the exact value.

Further embodiments, advantages, and possible applications of the invention derive from the following description of exemplary embodiments and from the figures. In this context, all the features described or pictorially represented, alone or in any desired combination are in principle the object of the invention, regardless of their relationship in the claims or reference to them. The contents of the claims are likewise made a constituent part of the description.

BRIEF DESCRIPTION OF THE DRAWINGS

The invention is described in greater detail hereinafter on the basis of the figures, relating to exemplary embodiments. The figures show:

FIG. 2b shows a path through the printing device shown in FIGS. 1 and 2a;

DETAILED DESCRIPTION

Figure 1:
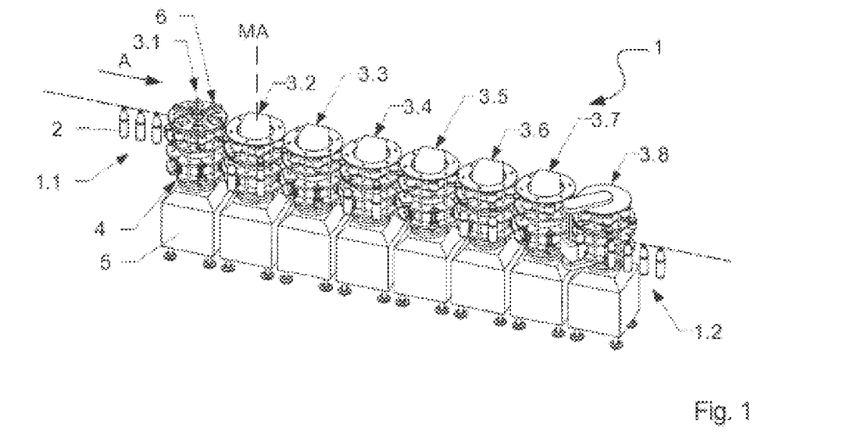
FIG. 1 is a perspective view of a printing device.

FIG. 1 shows a printing device 1 that prints directly on the outer surface of a container 2 or on a label that has been applied to the container 2.

Figure 2A:
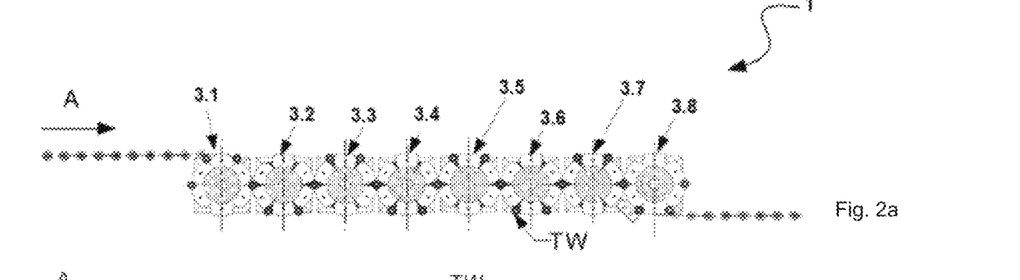
FIG. 2a shows a top view of the printing device of FIG. 1.
Figure 2B:
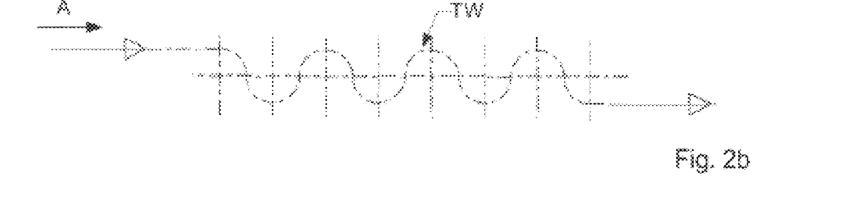

In operation, an outside conveyor causes containers 2 to enter the printing device 1 through its container inlet 1.1. The containers 2 do so while standing upright and moving in a conveying direction A. Once inside the printing device 1, the containers follow a meandering path TW as shown in FIGS. 2a and 2b. After having been printed on, the containers, which are still standing upright, exit through a container outlet 1.2.

The printing device 1 includes modules 3.1-3.n that are adjacent to each other along the transport direction A. In the illustrated embodiment, there are eight such modules 3.1-3.8. Each module 3.1-3.n has a base 4.

The bases 4 are the same for all modules 3.1-3.n. Each base 4 includes a housing 5 and a conveyor 6 on the housing's upper side. The housing 5 houses a drive and a control unit that drives the conveyor 6.

The conveyor 6 rotates about a vertical machine axis MA. It does so either continuously or intermittently in discrete steps.

Each conveyor 6 has modular treatment segments 7 attached to a circumference thereof. Within the treatment segment 7 are function elements that carry out some processing function on the container 2. These treatment segments 7 thus define the module's function. Examples of treatment segments 7 include those for sterilization, printing, for example with an inkjet printer, or for post-printing functions such as curing and drying, and for post-treatment functions such as inspection.

A puck 10 holds and centers a container 2 as it passes through the printing device 1 along the conveying direction A. Each container 2 has its own puck 10. Each treatment segment 7 includes a receiver for securely holding a puck 10 and then releasing it so that the puck 10 and its associated container 2 can continue to a subsequent module 3.$n$ for additional treatment steps. Conveyors 6 of adjacent modules 3.$n$, 3.$(n+1)$ rotate in opposite directions and in synchrony so that the conveyors 6 collectively move the puck 10 and its associated container 2 along the meandering path TW from the container inlet 1.1 to the container outlet 1.2.

An inlet module 3.1 carries out certain preliminary treatment steps. An example of such a step is a plasma or corona treatment to prepare the container 2 for multiple inkjet or tonejet printing steps that are to follow.

Printing modules 3.2-3.6 follow the inlet module 3.1 in sequence. Each printing module 3.2-3.6 prints in a different color. In the illustrated embodiment, the colors are white, yellow, magenta, cyan, and black, preferably in that order. Each printing module 3.2-3.6 has treatment segments 7 that carry out inkjet or tonejet printing. Within each of these treatment segments 7 is at least one print head, which prints with one color. In some embodiments, there may be more than one print head in a treatment segment 7. These embodiments can print in more than one color.

A drying module 3.7 follows the printing modules 3.2-3.6. The drying module 3.7 dries or cures the printed image through radiation. Examples include heat, or infrared radiation, and ultraviolet radiation.

An outlet module 3.8 follows the drying module 3.7. The outlet module 3.8 is where printed containers 2 leave the printing device 1. In some embodiments, the outlet module 3.8 carries out drying.

Additional modules can be added to the illustrated chain of modules 3.1-3.8. For example, some embodiments include an inspection module. Alternatively, some modules can be omitted depending on the particular application.

As shown in FIG. 2$b$, the inlet and outlet modules 3.1, 3.8 move a container 2 approximately 90° about the vertical machine axis MA. The remaining modules 3.2-3.7 move the container 2 by 180° about the vertical machine axis MA.

Figure 3:
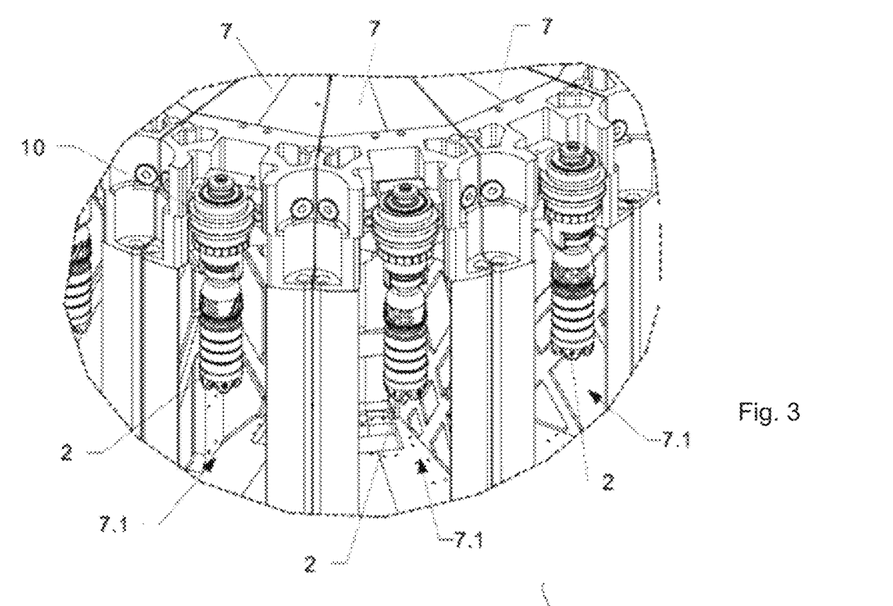
FIG. 3 is a perspective view of treatment segments from a transport element of the printing device shown in FIG. 1.
Figure 4:
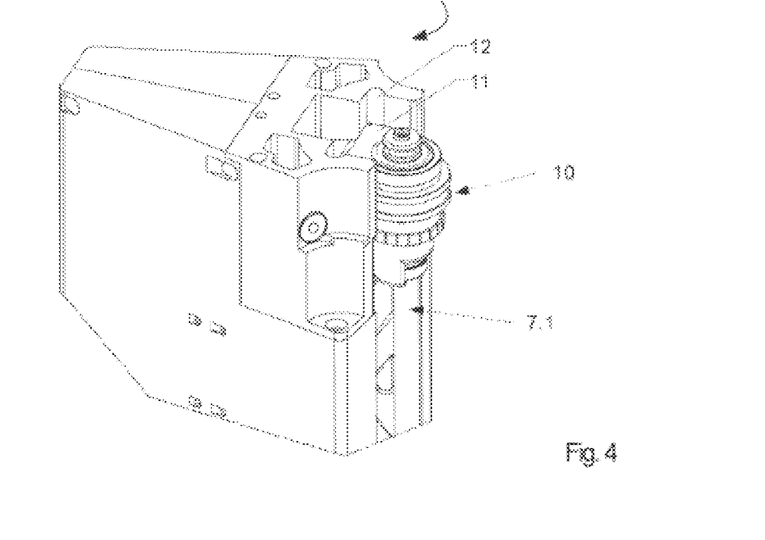
FIG. 4 is a perspective view of a puck.

As shown in FIGS. 3 and 4, each machine module 3.1-3.$n$ has plural treatment segments 7. The treatment segments 7 are modular. As such, they can be swapped in and out of the module and exchanged for other treatment segments 7.

Each treatment segment 7 is a functionally complete structural unit that includes structures needed to carry out the function of the particular module that it is attached to. The treatment segment 7 thus only needs to be connected to obtain consumables such as power or, in the case of the printing modules 3.2-3.6, ink.

In some embodiments, each treatment segment 7 is shaped like a wedge or slice of cake. Each treatment segment 7 is adjacent to and between neighboring treatment segments in much the same way that a slice of cake is adjacent to and between two other slices of cake. The treatment segments 7 of a machine module 3.1-3.$n$ thus form a circular ring, as can be seen in FIG. 3.

Each treatment segment 7 has an outer side that faces radially outward. Points on this outer side are therefore further from the machine axis MA than all other points in the treatment segment 7.

The outer side of a treatment segment 7 has a receiver 7.1 that accommodates containers 7. The receiver 7.1 receives a puck 10 that holds a container 2 and suspends the puck 10 so that the container 2 too is suspended.

Referring to FIG. 4, a carrier 11 holds a puck 10. Lateral grooves 12 engage and secure the carrier 11. In some embodiments, a driver drives the carrier 11 along the lateral grooves 12. This permits adjustment for containers having different sizes and shapes.

Each puck 10 holds and centers a container 2 so that it can be rotated or pivoted in a controlled manner. This is especially useful when printing on the container 2.

The individual print heads have subtle differences in performance relative to each other. These can arise, for example, from manufacturing variation.

For example, different print heads may deliver drops of slightly different size or with slightly different initial velocities resulting in slightly different color coverage. This means that the same perceived color would be achieved in different ways based on the properties of the print head. As an example, to achieve a particular shade of yellow, one print head may require two ink drops while another would use four smaller ink drops.

Figure 5:
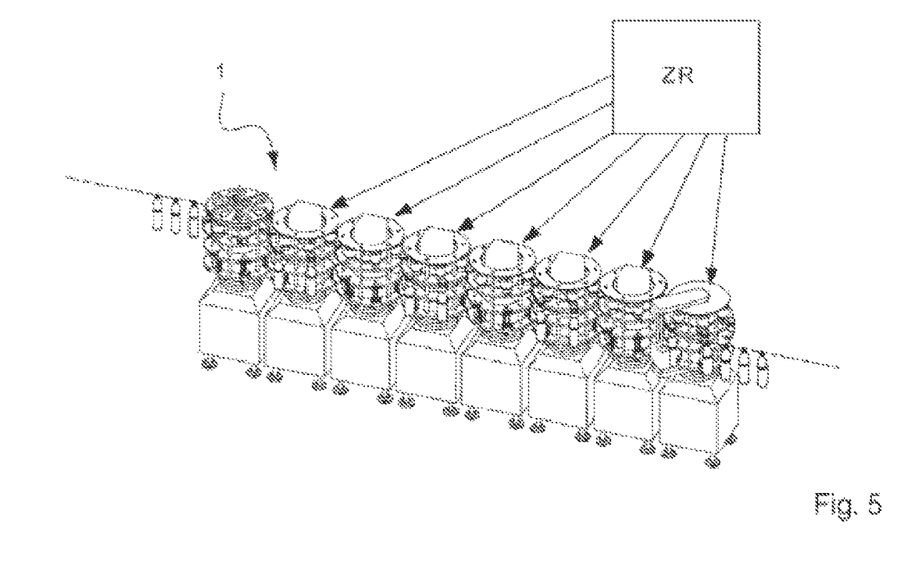
FIG. 5 shows the printing device of FIG. 1 coupled to a central computer.

To ensure that all containers create the same visual impression, it is useful to actuate print heads in a way that accommodates these differences so that, regardless of what group of print heads is used for printing, the same printed image results on the container 2. This can be achieved by providing a control system that includes a central computer ZR as shown in FIG. 5. As indicated by the arrows, the central computer ZR controls the actions of the printing device 1, including switching processes on and off, the overall speed of the printing device 1, and various movement sequences.

The control system can be a distributed control-system in which processors other than that at the central computer ZR are be located elsewhere, for example on a conveyor 6 or within a treatment segment 7. Collectively, the control system provides data needed for printing.

Figure 6:
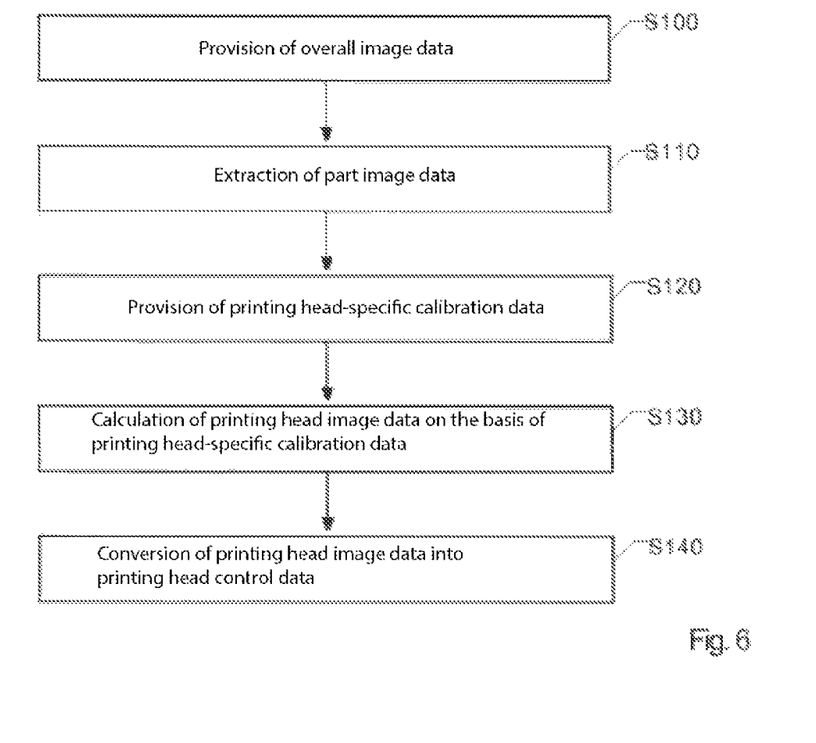
FIG. 6 is a flowchart of printing steps carried out by the apparatus shown in FIG. 5.

FIG. 6 shows a procedure to achieve uniform print quality regardless of which print heads are being used.

The procedure begins with providing overall-image data that contains information regarding colors that are to be in the printed image (step S100). Such information can include "partial image-data" which corresponds to those portions of the overall image that are printed in a particular color. For this reason, these are referred to herein as "color channels" that contain data on an individual color, referred to herein as "color data."

The central computer ZR decomposes the overall-image data into individual color channels of color data (step S110). Each color channel contains color data specific to a particular color. This is useful because each print head prints only one color. Therefore, a particular print head will only need a portion of the image data, namely the relevant one of its color channels. In some cases, the color channel is compressed to speed up communication and reduce memory requirements. The decomposition need not be carried out at the central computer ZR but can also be carried out at a processor assigned to or provided at a conveyor 6 or even at a computer assigned to or provided at a particular treatment segment 7.

Within the overall control system, there exists calibration data specific to each print head (step S120). Such calibration data, which will be referred to herein as "print-head-specific calibration-data," is typically stored in a storage unit provided at a printing station or in a storage unit provided in the print head itself. As an alternative, the print-head-specific calibration-data is stored centrally at the central computer ZR.

The print-head-specific calibration-data itself can be obtained in various ways. One way is to cause a print head to apply color to a substrate in a controlled manner and to subject that color to optical analysis so that the resulting color can be correlated with the manner of actuation. For example, it is possible to vary the number of ink drops used per drop and to observe the resulting color coverage for such value. Alternatively, it is possible to analyze the volumes of the ink drops and to correlate this with observed color. Preferably, such calibration data is obtained by using pre-determined reference operating parameters to ensure comparability with calibration data for different print heads.

Preferably, one obtains calibration data specific to print heads by using the print head to print on a test substrate the corresponds to the material that is ultimately to be printed upon during container printer. Additionally, the print head's orientation during acquisition of calibration data should match that which will be used during actual container printing. In a typical case, this orientation will result in ink drops being emitted in a horizontal or essentially horizontal direction.

The calibration data specific to a print head indicates how an optically-measured value depends on a parameter associated with how the print head is controlled. Each such measurement defines a data point on a calibration curve. In some embodiments, the calibration curve is assumed to be linear within a particular range.

In some embodiments, the optically-measured value is color coverage and the parameter used for print head actuation is selected from a group consisting of applied voltage, the number of drops per dot, the volume of each drop, and so on.

Although it is possible to rely on one set of calibration data, it is also possible to obtain several sets of print-head-specific calibration-data and to rely on several sets of print-head-specific calibration-data for later controlled actuation of the print head.

The next step is to use the print-head-specific calibration-data to calculate print-head image-data (step S130). The actual calculation can be carried out anywhere. However, it is particularly useful to carry out the calculation at a local processor associated with or located at the particular printing segment. In such a case, the print head receives only the particular color channel that corresponds to the color that it is to print. In many cases, the color data is provided in compressed form and unpacked at the local processor. This color data is then processed using the print-head-specific calibration-data for that print head to arrive at the print-head image data.

The color data itself can comprise a number of quantization steps, each of which defines a particular gray value. In some cases, there are 256 such quantization steps. Each gray level maps to a different way to control the print head. For example, to achieve a particular gray level, a print head can be made to use a different number of ink drops per dot. The exact number would come from the print-head-specific calibration-data.

In many cases, a print head will not be able to achieve 256 different numbers of ink drops to achieve each of the 256 possible gray levels. For example, many print heads are unable to eject more than seven drops per dot. Thus, it would only be physically possible to eject between zero and seven drops per dot. In such cases, it is useful to also map the 256 gray levels into a different quantization space that corresponds to the number of possible gray levels that can be achieved by a print head.

The next step is to convert the print-head image-data into print-head control-data (step S140). Such print-head control-data is used to actually control actuation of different individual nozzles of a print head. Thus print-head control-data is the low-level data that directly actuates the print head for printing on containers.

The need to map a high number of quantization steps into a lower number of quantization steps introduces quantization error. For example, when a first set of gray levels, which has 256 gray levels, is mapped to a second set of gray levels, which has only eight gray levels, there is a loss of resolution in gray levels. Inevitably, there will be gray levels from the first set that cannot be represented by the second set.

To reduce this quantization error or to at least reduce the effect of this error on the printed image, it is useful to carry out error diffusion. In this case, if a gray level from the first set is to be printed, and if that gray level is not available in the second set, it is instead represented by a set of gray levels that are available in the second set. The particular gray levels selected from the second set are such that a human's visual perception system will integrate those gray levels in such a way as to cause the human to perceive the gray level specified in the first set of gray levels. As an example, consider a gray level that yields a brightness of 3.5. Suppose that the second set permits only gray levels with integer values of brightness, thus preventing reproduction of the desired brightness of 3.5. To avoid an error in perception, the print head prints dots of gray levels 3 and 4 next to each other and relies on the human perception system's natural tendency to integrate these values so that the human will perceive a brightness of 3.5 anyway.

Within a given conveying element 6, all print heads print with the same color of ink. However, even with identical ink and identical actuation, it is possible for different print heads to print perceptibly different colors. It is thus desirable to match the color printed by one print head with that of all other print heads on the conveying element 6 so that the color perceived by a human on the container 2 will not depend on which print head was used to print on that container 2. To avoid this difficulty, it is useful to calibrate the print heads relative to each other.

Calibration of different print heads against each other relies again on the print-head-specific calibration-data. Such calibration data provides information on maximum available color coverage of a print head. This information on maximum color coverage can be compared across different print heads. This provides a basis for adjusting print heads on the same conveyor 6 relative to each other.

One method relies on the fact that each print head has its very own maximum color coverage value. Among the print heads, there will be a first print head that has the smallest maximum color coverage value and a second print head that will have the largest maximum color coverage value. All other print heads will have maximum color coverage values that are in between the smallest maximum color coverage value and the largest maximum color coverage value. With this in mind, a suitable procedure for ensuring uniformity among all print heads in the same conveyor 6 is to choke all print heads except the first print head to varying extents so that each print head will have a maximum color coverage value that is equal to that of the first print head.

The calibration procedure for ensuring that all print heads on the same conveyor 6 have the same color coverage value can be carried out by suitable selection of electrical parameters used in actuation. These include the extent of the applied voltage and the frequency with which that voltage is applied to a print head. Alternatively, it can be carried out by taking into account the existing and known deviates in color coverage values of each print head as obtained from the print-head-specific calibration-data. Such information can be stored at the printing segment itself.

The invention has been described heretofore on the basis of exemplary embodiments. It is understood that a large number of alterations or derivations are possible, without thereby departing from the inventive concepts underlying the invention.

The invention claimed is:

1. A method comprising printing multicolored images on containers using a printing device having conveyors that rotate around a vertical machine-axis, each conveyor comprising treatment segments, each of which comprises a print head, wherein each of said treatment segments prints a partial image of said multicolored image using an ink that corresponds to a color that is present in said multicolored image, wherein said treatment segments comprise first and second print heads, wherein printing said multicolored image comprises providing overall-image data, extracting partial-image data from said overall-image data, providing first print-head-specific calibration-data for said first print head and second print-head-specific calibration-data for said second print head, using said partial-image data and said first print-head-specific calibration-data for calculating first print-head image-data, using said partial-image data and said second print-head-specific calibration-data for calculating second print-head image-data, said first print-head image-data being different from said second print-head image-data, using said first print-head image-data, causing said first print-head to print a first partial image on a first container, and using said second print-head image-data, causing said second print-head to print a second partial image on a second container, wherein said first and second partial images are the same partial image, wherein said overall-image data contains image information for several different inks that have different colors, and wherein said partial-image data includes information indicative of a partial image that is to be printed with ink of a particular color by print heads at a particular conveyor.

2. The method of claim 1, further comprising, for said first print head, determining first print-head-specific calibration-data by causing said first print head to print and making measurements of a result of said first print head having printed and for said second print head, determining second print-head-specific calibration-data by causing said second print head to print and making measurements of a result of said second print head having printed.

3. The method of claim 1, wherein said first print-head-specific calibration-data provides information indicative of a relationship between a value used for controlled actuation of said first print head and a measurement of a result of said first print head having printed and wherein said second print-head-specific calibration-data provides information indicative of a relationship between a value used for controlled actuation of said second print head and a measurement of a result of said second print head having printed.

4. The method of claim 1, using said partial-image data and said first print-head-specific calibration-data for calculating said first print-head image-data comprises using a processor provided at a treatment segment that contains said first print head and wherein using said partial-image data and said second print-head-specific calibration-data for calculating said second print-head image-data comprises using a processor provided at a treatment segment that contains said second print head.

5. The method of claim 1, wherein using said partial-image data and said first print-head-specific calibration-data for calculating said first print-head image-data comprises using a processor assigned to a conveyor that carries said first print head and wherein using said partial-image data and said second print-head-specific calibration-data for calculating said second print-head image-data comprises using a processor assigned to a conveyor that carries said second print head.

6. The method of claim 1, wherein using said partial-image data and said first print-head-specific calibration-data for calculating said first print-head image-data comprises introducing quantization error that degrades gray scale resolution, whereby there exists at least one gray scale value that said first print head is unable to print.

7. The method of claim 6, wherein, within said partial image that is to be printed by said first print head, there exists a dot, wherein said first print head reproduces said data by applying printing a first dot and printing a second dot after printing said first dot, wherein printing said first dot comprises applying a first number of ink drops, wherein printing said second dot comprises applying a second number of ink drops, and wherein said first and second numbers differ.

8. The method of claim 1, wherein using said partial-image data and said first print-head-specific calibration-data for calculating said first print-head image-data comprises determining a first number of ink drops, wherein using said partial-image data and said second print-head-specific calibration-data for calculating said second print-head image-data comprises determining a second number of ink drops, wherein, within said partial image that is to be printed by said first and second print heads, there exists a dot, wherein, to print said dot, said first print head uses said first number of ink drops, wherein, to print said dot uses said second number of ink drops, and wherein said first and second numbers are different.

9. The method of claim 1, further comprising, for all print heads on the same conveyor, carrying out an equilibration step to cause said print heads to have a uniform color coverage value.

10. The method of claim 9, wherein each print head on said conveyor has a maximum color-coverage-value, wherein a first print head on said conveyor has a minimum maximum-color-coverage-value, and wherein carrying out said equilibration step comprises causing all print heads on said conveyor to print at said minimum maximum-color-coverage-value.

11. The method of claim 1, wherein said overall-image data is at a central computer unit that provides said overall image data to said conveying elements.

12. The method of claim 1, wherein extracting said partial-image data from said overall-image data is carried out at a central computer.

13. The method of claim 1, wherein extracting said partial-image data from said overall-image data is carried out at a processor arranged at a conveyor.

14. The method of claim 1, wherein extracting said partial-image data from said overall-image data is carried out at a processor arranged at a treatment segment.

15. The method of claim 1, further comprising transmitting said partial-image data to a treatment segment that is to be used to print said partial image on containers.

16. The method of claim 1, further comprising calculating print-head control-data from said print-head image-data.

17. The method of claim 16, further comprising using said print-head control-data to actuate nozzles in said print head, wherein different print heads actuate nozzles differently when printing the same partial image on said container.

18. An apparatus for printing, on a container, a multicolored image, said apparatus comprising a container-conveying segment that moves said container from a container inlet to a container outlet, wherein said container-conveying segment comprises conveyors, each of which rotates about a vertical machine-axis, wherein each conveyor holds, centers, and moves containers in a controlled manner, wherein each of said conveyors comprises treatment segments, each of which comprises a print head, wherein each treatment segment prints a partial image on said container, said partial image being printed using an ink that corresponds to a color that is present in said multicolored image and using print-head image-data corresponding to said print head, said apparatus further comprising a memory and a processing system, wherein said memory stores print-head-specific calibration-data corresponding to each print head, and wherein said processing system is configured to provide overall-image data concerning said multicolored image, to extract, from said overall-image data, partial-image data for each of a plurality of partial images, each of which is printed using one of said colors, and to calculate, for each print head, print-head image-data based on print-head-specific calibration data specific to said print head and partial-image data assigned to a treatment segment that comprises said print head.

* * * * *